UNITED STATES PATENT OFFICE.

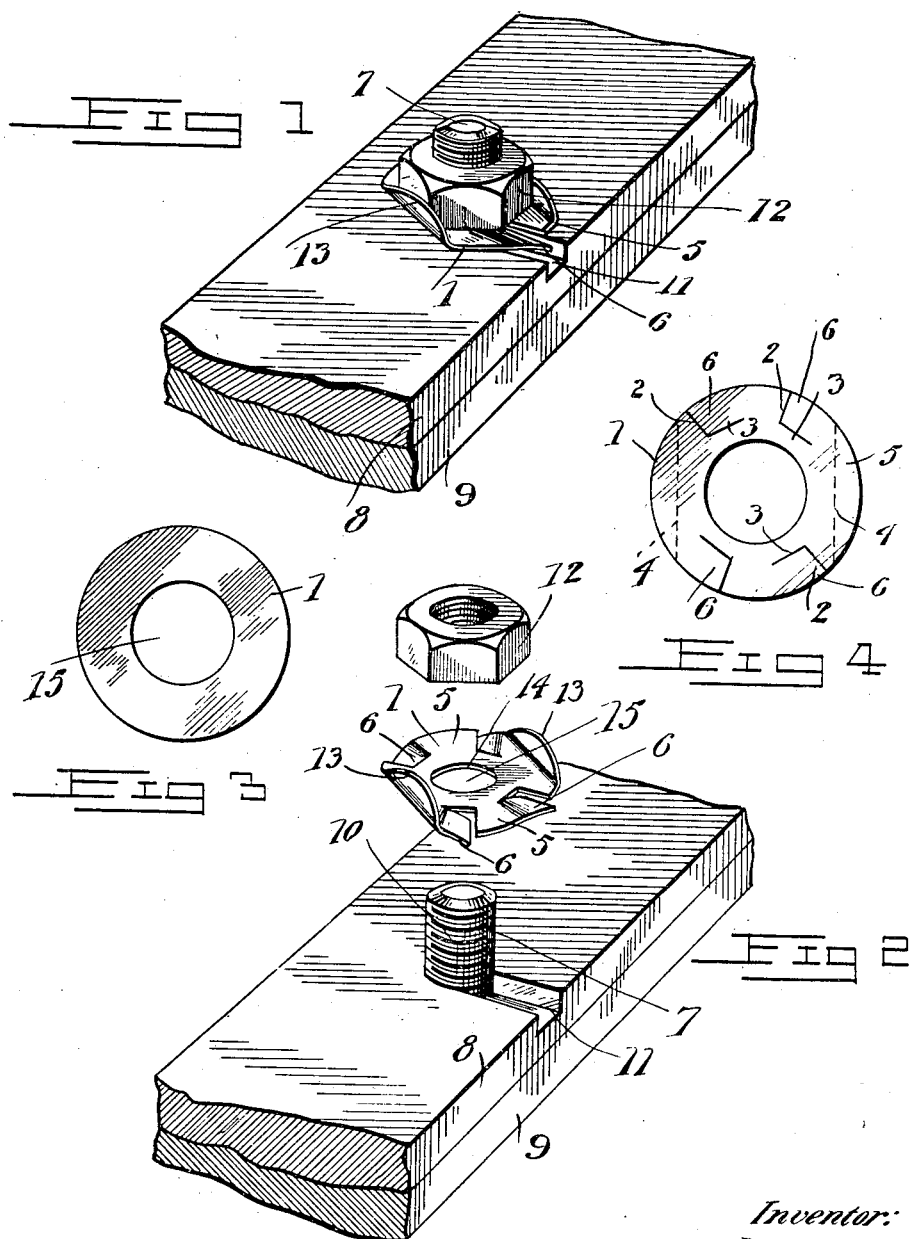

ALEXANDER C. BRIDGE, OF LACHINE, QUEBEC, CANADA.

SPRING LOCK-WASHER.

1,374,054. Specification of Letters Patent. Patented Apr. 5, 1921.

Application filed August 12, 1919. Serial No. 317,013.

*To all whom it may concern:*

Be it known that I, ALEXANDER C. BRIDGE, a subject of the King of Great Britain, residing at Lachine, Province of Quebec, Canada, have invented certain new and useful Improvements in Spring Lock-Washers; and I do hereby declare that the following is a full, clear, and exact description of the invention, such as will enable others skilled in the art to which it appertains to make and use the same.

The present invention has relation to spring lock washers for bolts and nuts and the principal object is to provide a device of the character set forth, for locking the bolt against movement within the element it is attached to and for holding the nut against rotation thereon.

A further object of the invention is to provide a washer having elements that may be distorted, whereby the bolt and nut are held in interlocking engagement.

With the above and other objects in view which will hereinafter appear as the description continues, the invention consists of the novel features of construction, combination and formation of parts, as will be hereinafter more fully described and particularly pointed out in the appended claim.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawings:

Figure 1, is a perspective view illustrating the application of the device to a bolt and nut.

Fig. 2, is a similar view with the locking elements removed from the bolt.

Fig. 3, is a plan view of the washer in its initial form.

Fig. 4, is a similar view of the washer after the stamping operation to form the distortable segments.

I shall refer now more particularly to the accompanying drawings wherein like and corresponding parts are designated by similar reference characters throughout the several views.

In connection with railroad track connecting work and likewise in machine equipment, it is necessary in result of the vibration encountered to securely lock the elements together and with that purpose in view, I have provided a lock washer 1, preferably constructed of relatively thin spring steel, which latter is initially struck out by a stamp press to form the diametrically disposed cuts 2 and 3 and the scorings 4. By so striking the metal to form said cuts 2 and 3, the segments 5 and the tongues 6 are formed.

The bolt 7 is adapted for projection through registering openings in the plates 8 and 9 and carries the usual head, not illustrated and the threaded shank 10. The plate 8 is formed with a rectangular countersink 11 and before the nut 12 is adjusted upon the threaded shank 10 of bolt 7, the tongues 6 of washer 1 are bent downwardly which operation forms the segments 5. One of the tongues 6 will be disposed in the countersink 11 of plate 8 and when the nut 12 is tightened up, the other tongues 6 will bite into the metal surface of plate 8.

This washer 1 is made of spring steel and by bending its opposite edges along the lines of the scoring 4 the binding lips 13 are formed.

These lips engage the opposite side edges of the nut 12 and together with the tongues 6, bind the nut 12 against movement on the bolt.

The segments 5, together with the flat portion 14, contiguous to the central bolt opening 15 of the washer, forms a flat seat for the under face of the washer.

When it is desired to remove the nut a suitable tool may be inserted within the countersunk portion 11 of the plate 8 and the tongue 6 projecting within this countersunk portion may be raised there above so that the nut may be permitted to turn and be removed from the bolt.

Having thus fully described my invention, what I claim as new and desire to secure by Letters Patent is:

In a washer such as described, the combination of a flat circular piece of metal having a central concentric opening formed therein, said material being cut at diametrically opposite points radially from the center of the metal to the outer edge thereof and thence from the inner edge of said cut portions tangentially to the central opening, said material at the cut portions being bent in like directions forming spring fingers, said radially cut portions being spaced closely together in pairs, and the material at the sides of said pairs being bent tangentially through the central portion thereof at right angles to the material to form locking flanges, substantially as and for the purposes set forth.

In witness whereof I have hereunto set my hand.

ALEXANDER C. BRIDGE.